US006960147B2

(12) United States Patent
Kolstrup

(10) Patent No.: US 6,960,147 B2
(45) Date of Patent: Nov. 1, 2005

(54) PLANET GEAR AND USE THEREOF

(75) Inventor: Anders Peter Kolstrup, Valby (DK)

(73) Assignee: Roulunds Rotrex A/S, Valby (DK)

( * ) Notice: Subject to any disclaimer, the term of this patent is extended or adjusted under 35 U.S.C. 154(b) by 54 days.

(21) Appl. No.: 10/468,069

(22) PCT Filed: Jan. 21, 2002

(86) PCT No.: PCT/DK02/00040

§ 371 (c)(1),
(2), (4) Date: Nov. 3, 2003

(87) PCT Pub. No.: WO02/064997

PCT Pub. Date: Aug. 22, 2002

(65) Prior Publication Data

US 2004/0097325 A1 May 20, 2004

(30) Foreign Application Priority Data

Feb. 14, 2001 (DK) .......................................... 2001 00237

(51) Int. Cl.[7] ........................... F16H 3/70; F16H 57/08
(52) U.S. Cl. ..................... 475/170; 475/335; 475/347
(58) Field of Search ................................ 475/170, 178, 475/179, 182, 183, 195, 346–348, 335

(56) References Cited

U.S. PATENT DOCUMENTS

| 2,815,685 A | * | 12/1957 | Thomas ..................... 475/183 |
| 3,129,611 A | * | 4/1964 | Royal ......................... 475/179 |
| 3,945,270 A | * | 3/1976 | Nelson et al. ................ 476/61 |
| 4,408,502 A | * | 10/1983 | Kraus .......................... 476/59 |
| 4,408,503 A | | 10/1983 | Kraus |
| 4,481,842 A | | 11/1984 | Nelson |
| 4,648,288 A | * | 3/1987 | Kato et al. .................. 475/183 |
| 4,709,589 A | | 12/1987 | Kraus |
| 5,046,996 A | * | 9/1991 | Horvath ...................... 475/197 |
| 6,554,730 B1 | * | 4/2003 | Sakai et al. ................. 475/195 |
| 6,719,658 B2 | * | 4/2004 | Haga et al. ................. 475/163 |

FOREIGN PATENT DOCUMENTS

| EP | 0 877 181 A | 11/1998 |
| WO | WO 96/30670 A | 10/1996 |

* cited by examiner

*Primary Examiner*—Tisha Lewis
(74) *Attorney, Agent, or Firm*—William J. Sapone; R. Neil Sudol; Henry Coleman

(57) ABSTRACT

A planetary gear comprising a central, rotatable input/output shaft (1a), an elastic outer ring (4) which when being elastically deformed encloses and presses at least three planet wheels (6, 12) in the form of rollers radially against a centrally mounted sun shaft (2), which extends axially in alignment with the input/output shaft (1a). The planet wheels (6, 12) have central holes and are rotatably mounted on stays (7, 13), the centre lines of the stays (7, 13) being parallel with the sun shaft (2). At least two (12) of the planet wheels have substantially coinciding centres with the stays (13) associated with the planet wheels (12), while the planet wheel or other planet wheels (6) as well as the associated stay or stays (7) is/are constructed such that the centre lines of the stays are positioned a given distance closer to the sun wheel (2) than the axes of the planet wheels (6) when the planet wheels (6) engage the sun shaft (2). This results in an optimum transfer of moment, while achieving an accurate positioning of the sun shaft as well as the planet wheel or the other planet wheels against the at least two planet wheels having centres which coincide with the respective stays.

15 Claims, 10 Drawing Sheets

PLANET GEAR AND USE THEREOF

THE PRIOR ART

Figure 1:
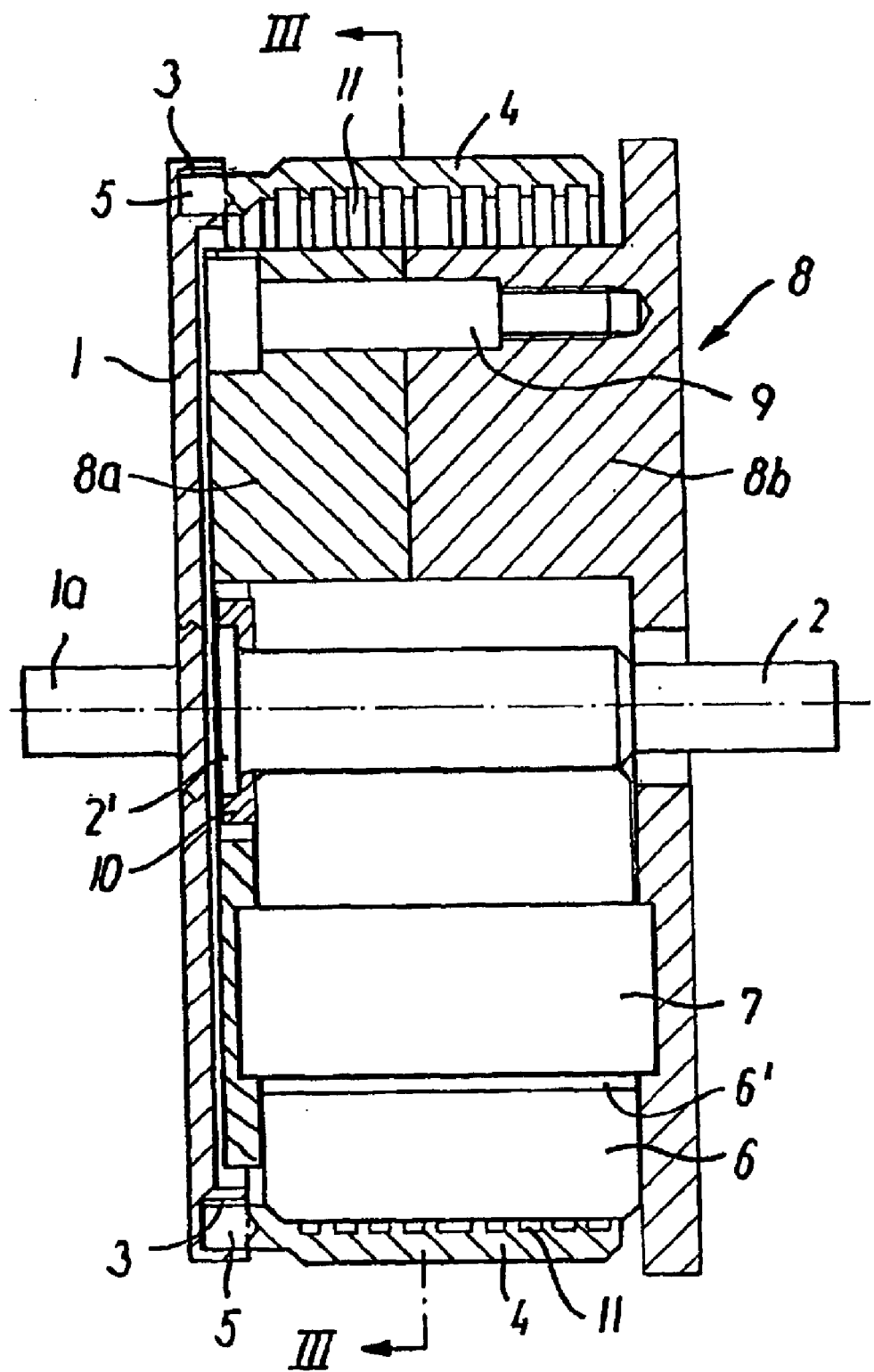

The invention relates to a planetary gear having a central, rotatably mounted sun wheel, at least three planet wheels arranged around the sun wheel which are rotatable about their own axes, means for resiliently pressing the peripheral outer faces, which are in the form of faces of revolution, of the planet wheels into force transferring engagement with the peripheral outer face of the sun wheel.

A planetary gear of the type stated above is known from U.S. Pat. No. 2,344,078 which is used for driving a centrifugal charger for an internal combustion engine. In this planetary gear, the stays of the plant wheels are mounted on a carrier which is firmly connected with the input shaft, and the centre lines of the stays are located on a pitch diameter which coincides with the axes of the planet wheels when the planet wheels engage the sun shaft. The length of the sun shaft, which is in contact with the planet wheels, is adapted such that the friction between them ensures the transfer of moment. By allowing the planet wheels to rotate about fixed stays a constant force is achieved between planet wheels and sun shaft.

In a centrifugal charger, increasing transfer of moment is required with in creasing speed. In the above-mentioned known planetary gear, however, decreasing transfer of moment is achieved at an increasing speed because of the centrifugal forces, since, at high speeds, the centrifugal forces on the planet wheels reduce the available friction between sun shaft and planet wheels like the planetary gear discussed above.

Moreover, a planetary gear of the type stated initially is known from DK 171,047 B1. In this known planetary gear it is intended to automatically adapt the transferred moment to the need even at high speeds, which is achieved in this prior art in that the diameters of the stays are smaller than the holes of the planet wheels, and in that the centre lines of the stays are located closer to the sun shaft than the axes of the planet wheels when the planet wheels engage the sun shaft.

OBJECT OF THE INVENTION

It is an object of the invention to provide a planetary gear which ensures an optimum transfer of moment relative to the art thus known, while ensuring an exact positioning of the planet wheels in the planetary gear in all operational conditions, thereby preventing occurrence of operational problems because of the mounting of the planet wheels and the sun shaft taught by the prior art.

This object is achieved according to the invention in that at least one and maximum two of the planet wheels is/are mounted such that its axis/their axes of rotation is/are substantially fixed relatively to the axis of rotation of the sun wheel, while each of the other planet wheels is arranged on a shaft part extending with a predetermined play into a central bore provided in the planet wheel concerned, such that the radial distance between the centre line of the shaft part and the axis of rotation of the sun wheel is smaller by a predetermined value than the corresponding radial distance between the centre line of the planet wheel concerned and the axis of rotation of the sun wheel when the planetary gear is in its operational state, in which all the planet wheels are in engagement with the sun wheel, and each of the shaft parts is in engagement with the inner surface of the corresponding bore.

This ensures that the planet wheel or wheels mounted by means of a stay or stays whose centre lines are located a given distance closer to the sun shaft than the axes of the planet wheels when the planet wheels engage the sun shaft, will give a "ramp effect", whereby the transferred moment is adapted to the need, while this planet wheel or these planet wheels will press the sun shaft inwards against the two planet wheels which are positioned with centres coinciding with their respective stays. This will ensure an exact positioning of both sun shaft and the other planet wheels against thee two planet wheels, which, as mentioned, are positioned by means of their respective stays.

When, as stated in claim 2, the given distance is in excess of the normal accuracy of the machining, preferably in excess of about 0.01 mm, the given difference in distance is greater than the normal accuracy of the machining and preferably greater than 0.01 mm.

When, as stated in claim 3, the given distance is in a range of substantially 0.1–2.0 per thousand of the radial dimension of the planetary gear and preferably in a range of substantially 0.5–1.0 per thousand, an expedient moment transfer function will be achieved, since the moment is adjusted to the given need.

When, as stated in claim 4, the planet wheel or the other planet wheels as well as the associated stay or stays is/are constructed such that the stay or stays is/are formed with an outer diameter which is smaller than the inner diameter of the corresponding wheel in the planet wheel or wheels, the difference in diameters being in excess of the normal machining accuracy, preferably in excess of about 0.01 mm, the desired relation between the centre line/lines of the stay/stays and the axis/axes of the planet wheel/wheels may be achieved.

When, as stated in claim 5, the planet wheel or the other planet wheels as well as the associated stay or stays is/are constructed such that each stay comprises an eccentric mounted rotatably thereon, the desired ramp effect is achieved. Simultaneously, the planet wheel or the other planet wheels may be constructed identically with the first-mentioned ones, as the outer diameter of the eccentric body may correspond to the outer diameter of a stay for the first-mentioned planet wheels, thereby facilitating the production.

When, as stated in claim 6, the centre of the stay is positioned closer to the centre of the sun shaft than the centre of the associated eccentric, an expedient structure is achieved.

When, as stated in claim 7, the centre of the stay is positioned further away from the centre of the sun shaft than the centre of the associated eccentric, it is additionally ensured that an overload protection may be achieved.

When, as stated in claim 8, the planet wheels are constructed substantially identically, and they are preferably constructed as bearings, preferably roller bearings whose inner diameter substantially corresponds to the outer diameter of the stays, and whose outer bearing ring serves as a planet wheel, a saving and a simpler production of the planetary gear are achieved, since different planet wheels need not be produced.

Finally, the invention relates to a use of the planetary gear as defined in claim 9 where the planetary gear may be used for transferring moment at high gear ratios, e.g. up to 13:1, and/or at a relatively great transfer of moment using a relatively small volume, such as for transferring moment to compressors for internal combustion engines or for transferring moment to propulsion wheels in vehicles.

THE DRAWING

Figure 2:
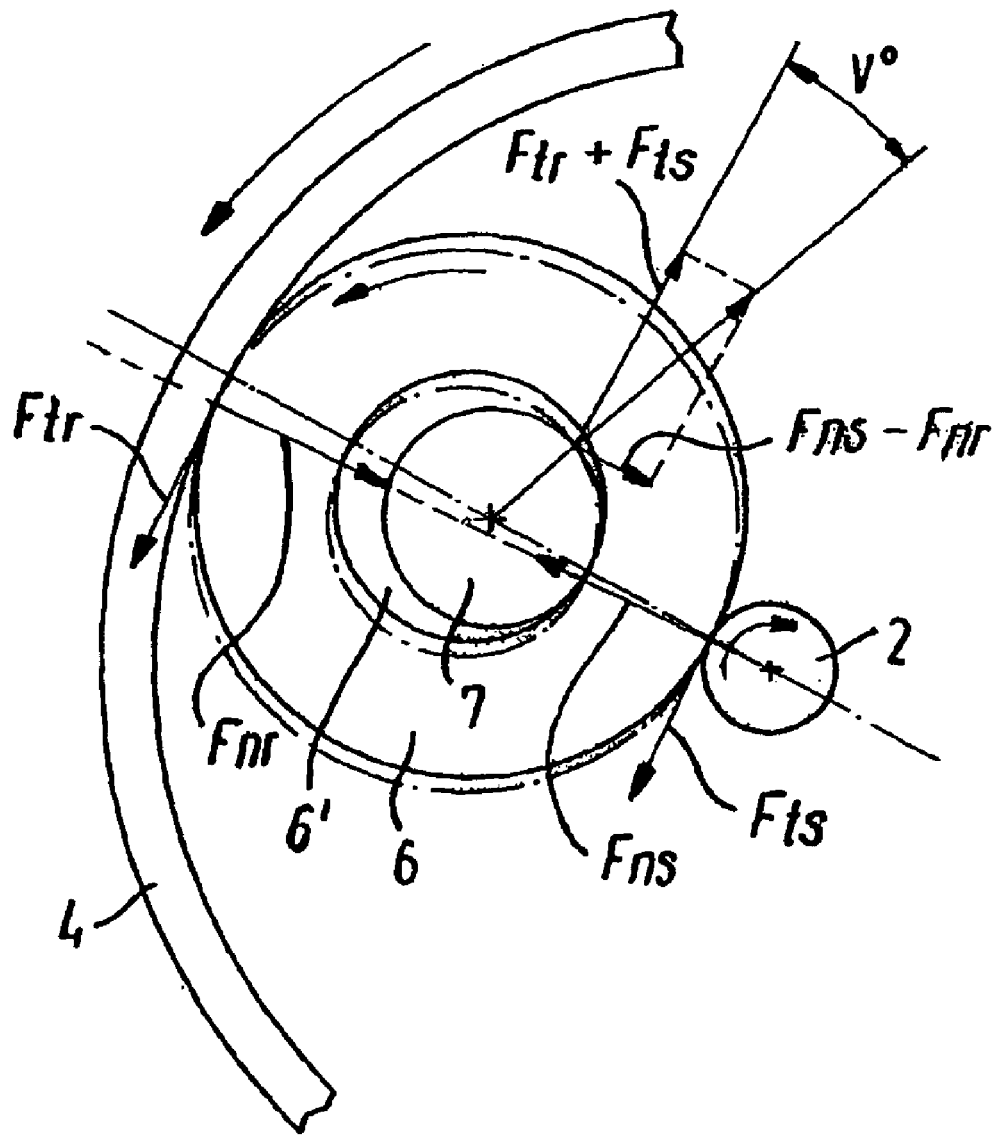
Figure 3:
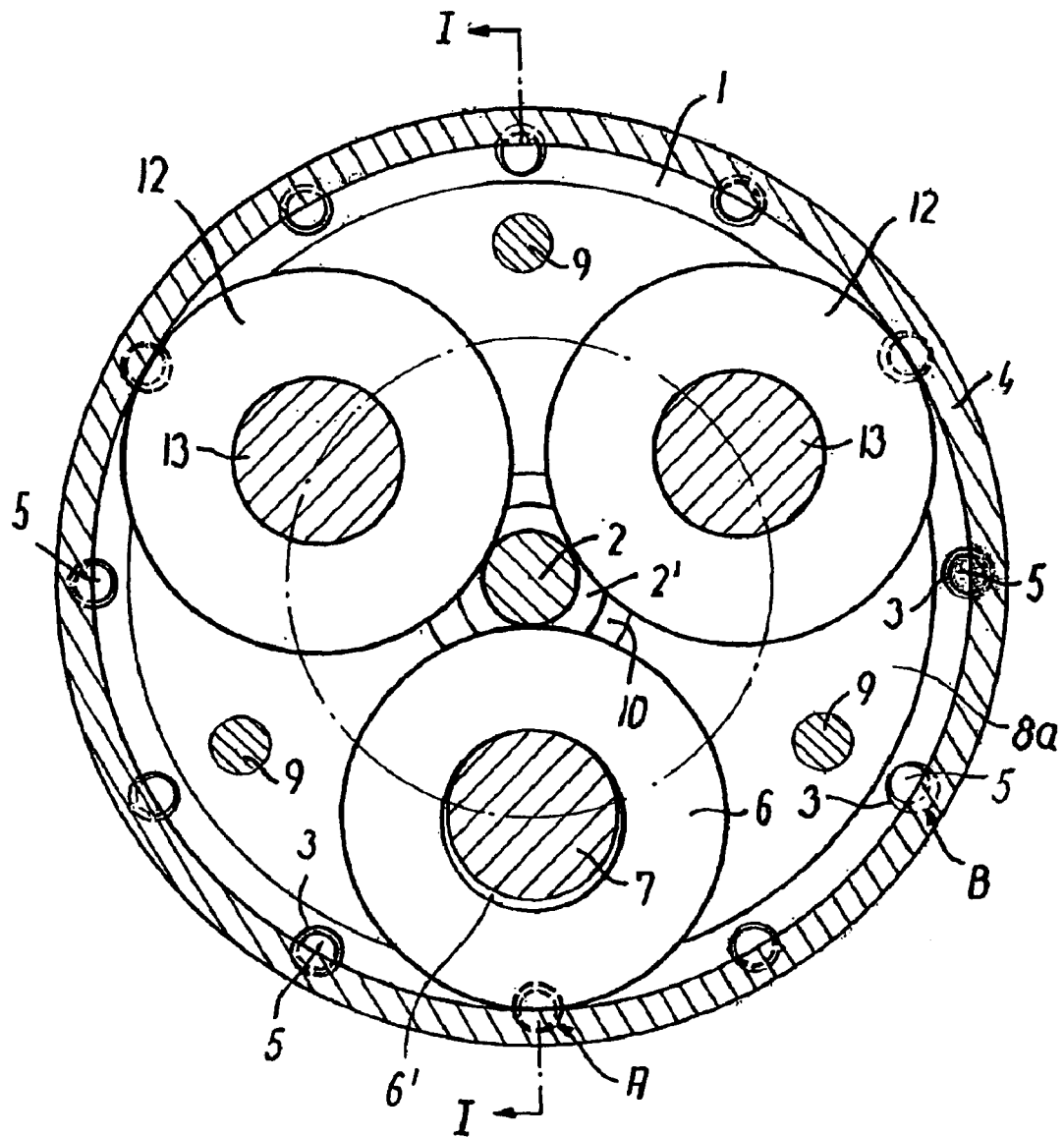
Figure 4:
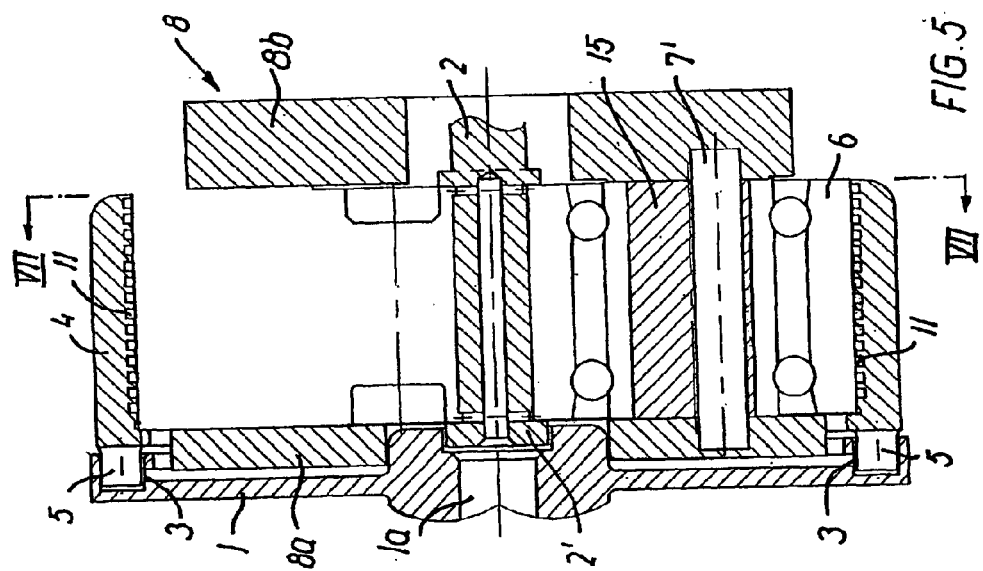
Figure 5:
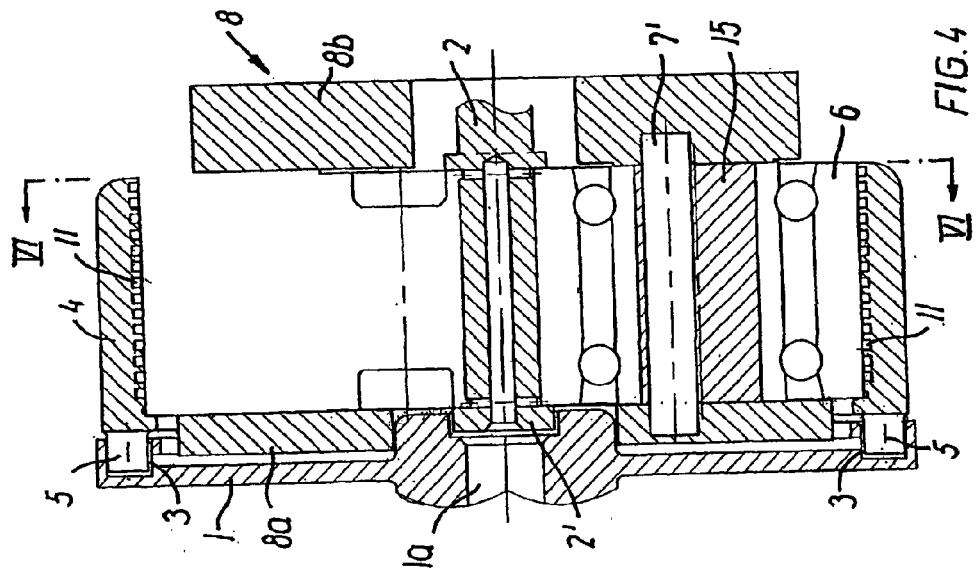
Figure 6:
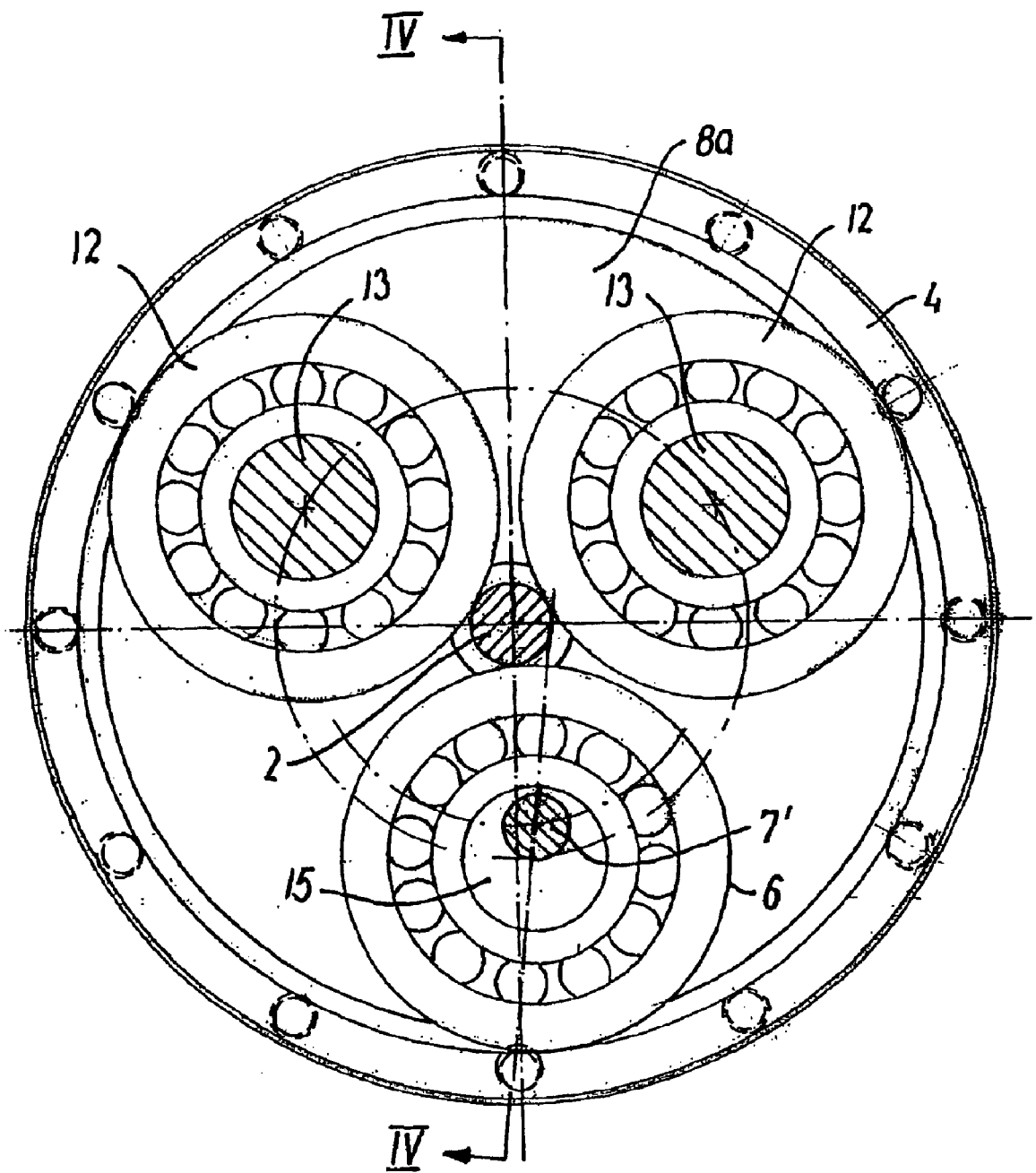
Figure 7:
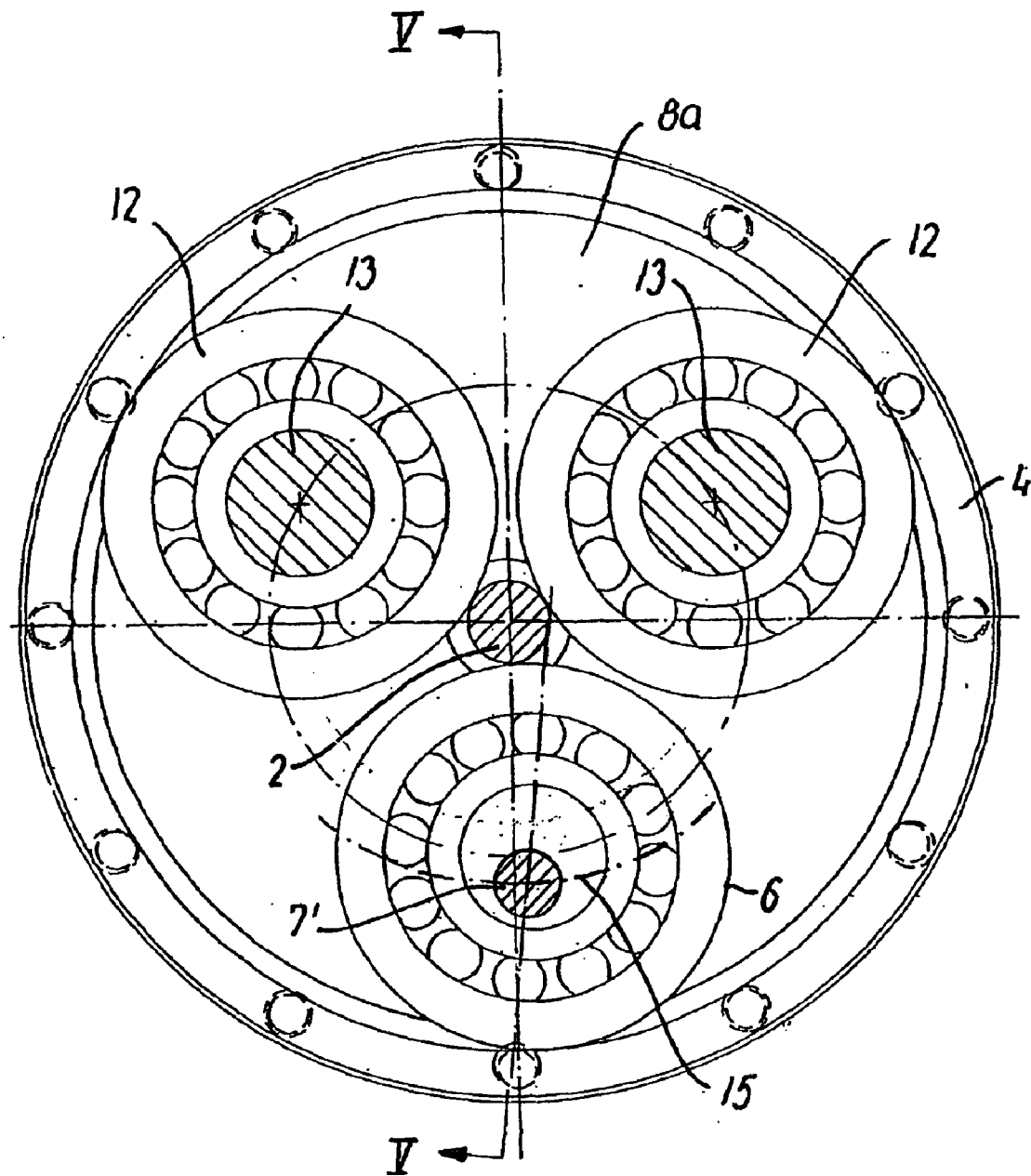
Figure 8A:
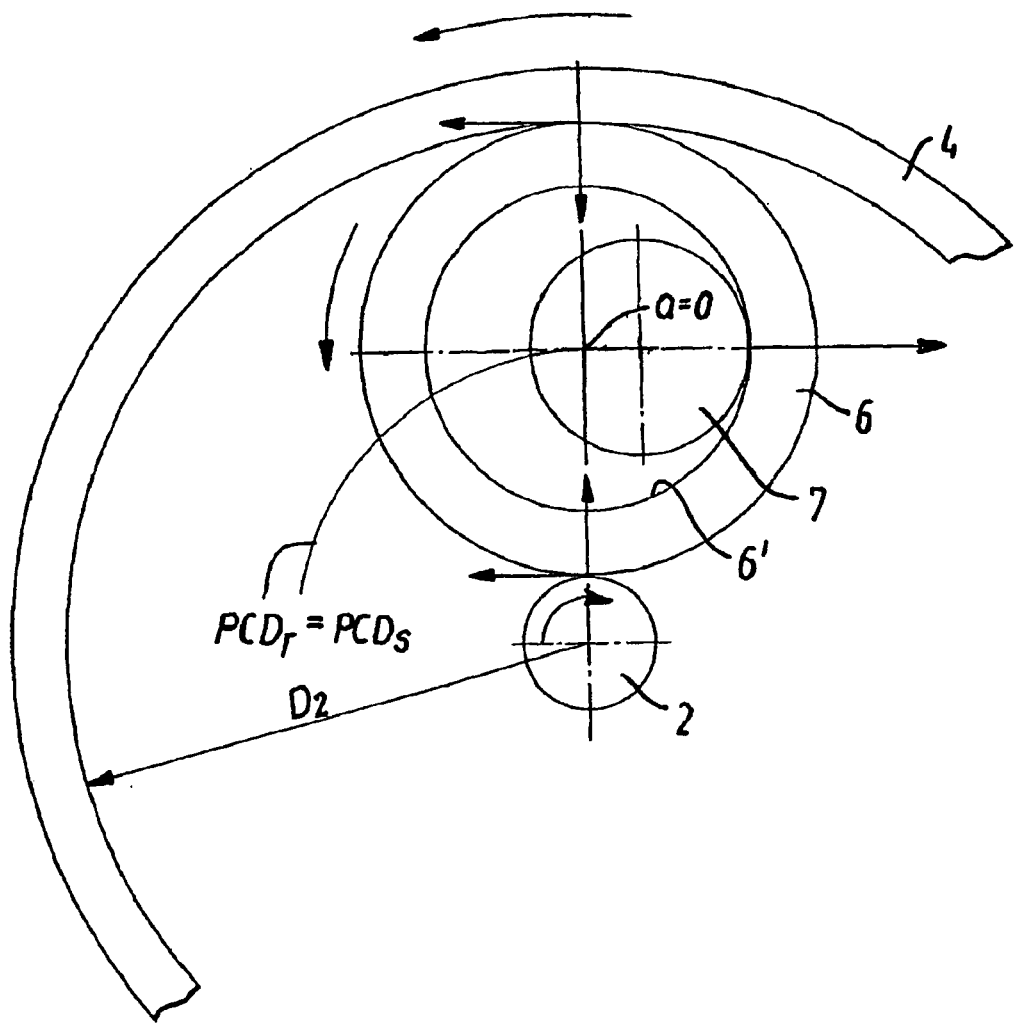
Figure 8B:
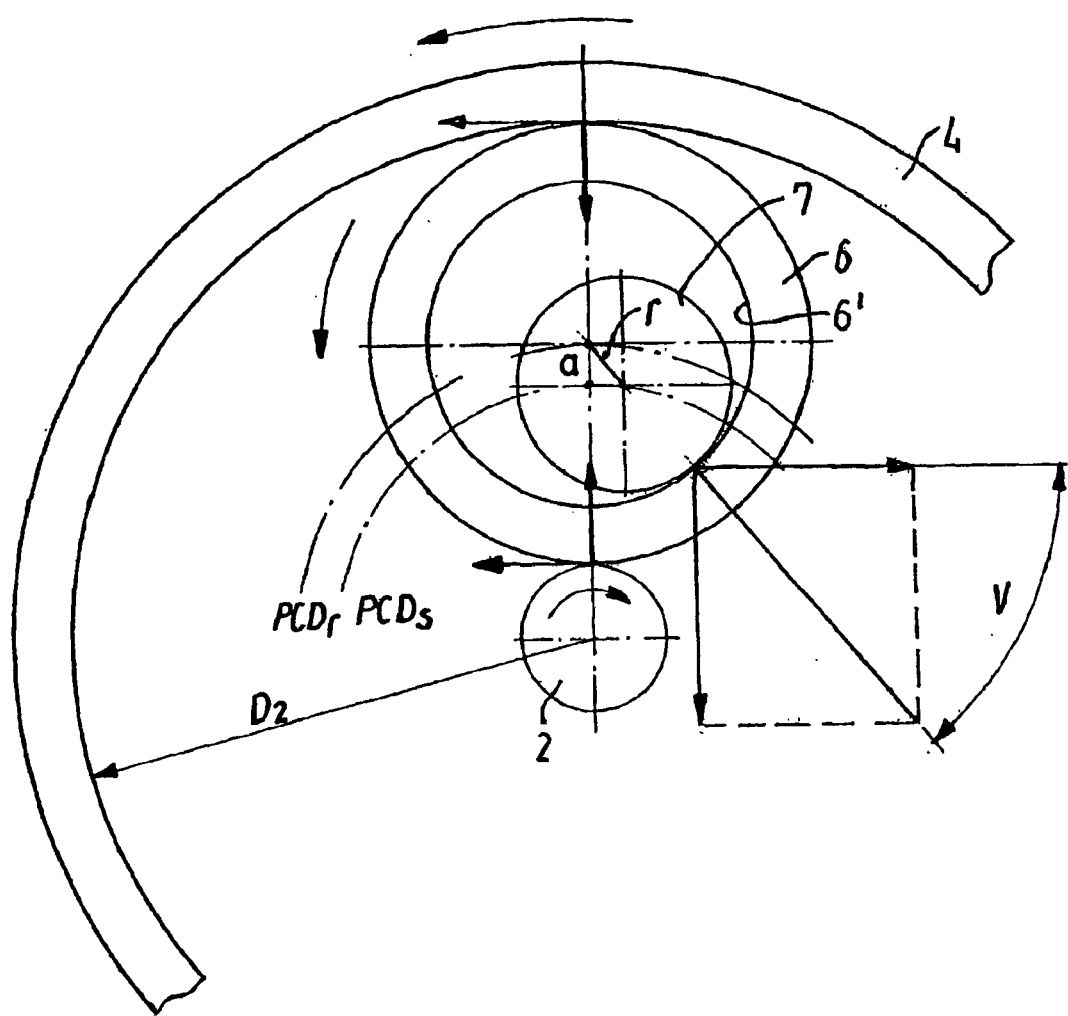
Figure 8C:
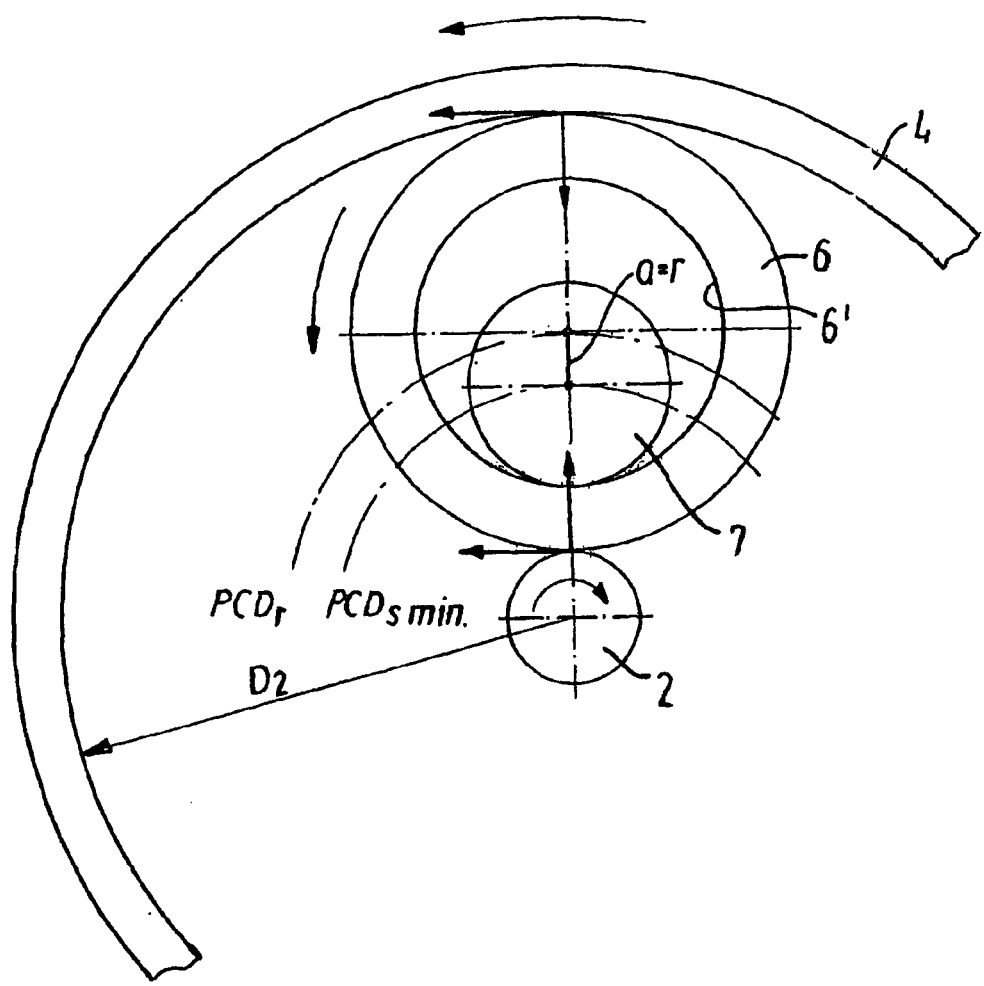
Figure 9:
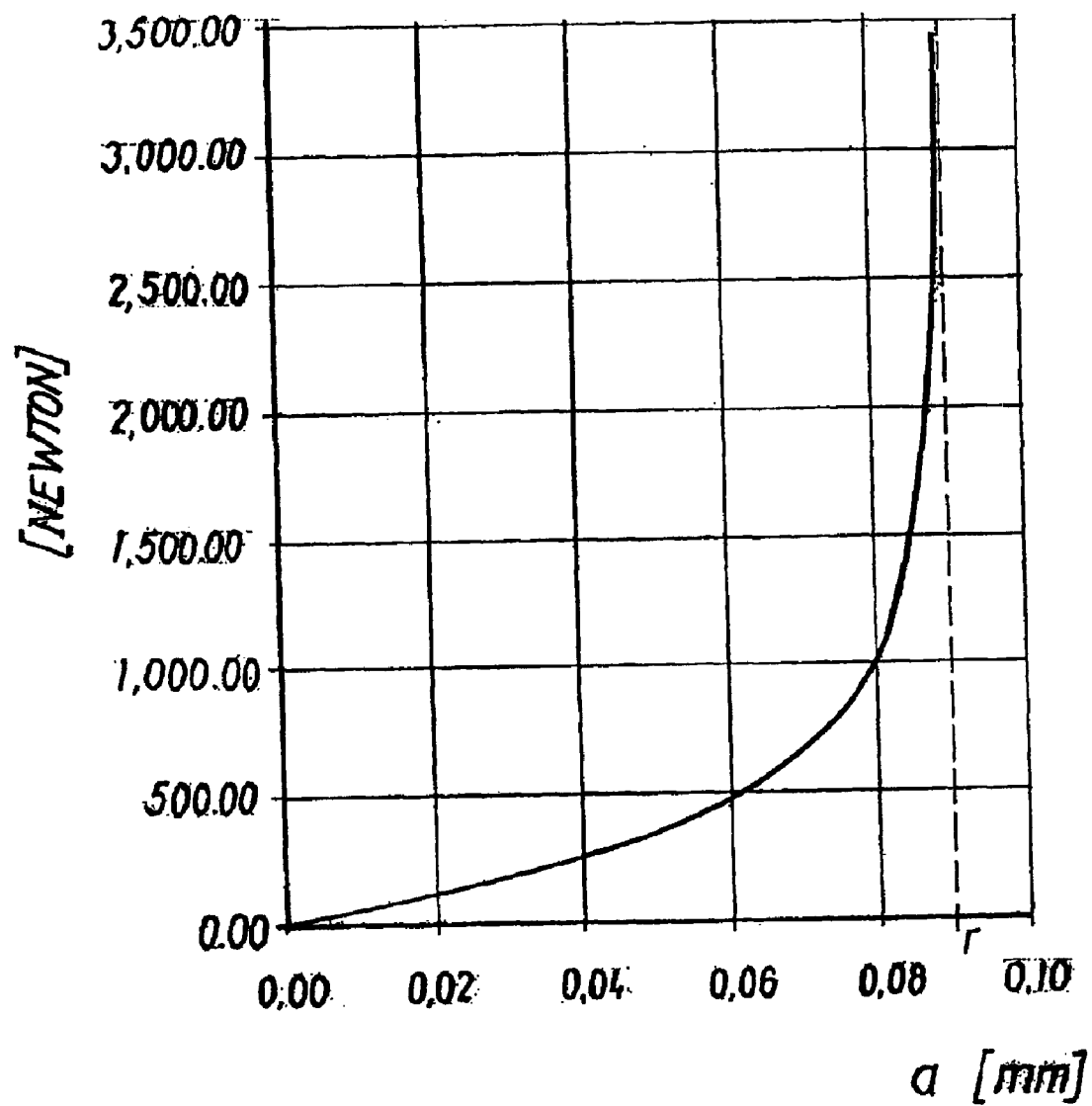

Embodiments of the invention will be described more fully below with reference to the drawing, in which FIG. 1 shows a sectional view of a planetary gear according to the invention seen in the direction (I—I in FIG. 3, FIG. 2 shows the forces between the outer ring, a planet wheel and the sun shaft in the planetary gear according to the invention, FIG. 3 shows a sectional view of the outer ring and the planet wheels in the planetary gear seen in the direction III—III in FIG. 1, FIGS. 4 and 5 show sections corresponding to FIG. 1, but of another embodiment of the invention, seen in the direction IV—IV in FIG. 6 and V—V in FIG. 7, respectively, FIGS. 6 and 7 show sectional views corresponding to FIG. 3, but of another embodiment of the invention, seen in the direction VI—VI in FIG. 4 and VII—VII in FIG. 5, respectively, FIGS. 8a–c are sketch views of a section of an outer ring, a sun shaft and a planet wheel in a planetary gear according to the invention, illustrating the distance conditions for achieving the ramp effect, and FIG. 9 shows a curve of the theoretically transferred force in a planetary gear according to the invention.

DESCRIPTION OF THE EMBODIMENTS

FIG. 1 shows a section through a planetary gear according to an embodiment of the invention. The gear comprises a circular disc-shaped carrier 1 having on one side a protruding stub shaft 1a which forms an input shaft whose rotation is to be converted into rotation of a sun shaft 2, whose one end extends out of the gear, said sun shaft 2 being axially aligned with the input stub shaft 1a.

Equidistantly spaced near the circumference of the carrier 1 is a plurality of holes 3, whose number is e.g. twelve as shown in FIG. 3. Also provided is an elastic outer ring 4 which has pins 5 on the side facing the carrier 1, said pins corresponding in number to the holes 3 and extending into these.

The pins 5 have a smaller diameter than the holes 3 so that the elastic outer ring 4 may be moved and deformed slightly relative to the carrier 1. The engagement of the pins 5 with the holes 3 causes the outer ring 4 to be driven by the carrier 1 when this is rotated.

The outer ring 4 encloses a planet wheel 6 as well as two planet wheels 12, as is shown in FIG. 3. The planet wheels are constructed as rigid bushings or rollers which engage the sun shaft 2 arranged centrally between the planet wheels 6 and 12.

The planet wheels 6 and 12 have central holes and are mounted on stays 7 and 13, respectively. The planet wheel 6 is mounted loosely on the stay 7 whose outer diameter is slightly smaller than the hole 6' in the planet wheel 6, while the planet wheels 12 are mounted rotatably and without play on the stays 13. The centre line of stay 7 of the planet wheel 6 is therefore parallel with, but does not coincide with the axis of the planet wheel 6, while the centre lines of the stays 13 of the planet wheels 12 coincide with or substantially coincide with the axes of the planet wheels 12.

The stays 7 and 13 are controlled in a frame 8 which consists of a first frame part 8a and a second frame part 8b, whereby also the planet wheels 6 and 12 are controlled within the elastic outer ring 4.

The two frame parts 8a, 8b are assembled by means of control bolts 9 whose cylindrical stems fit snugly in bores in the frame parts to ensure their mutually exact position.

To ensure the axial position of the sun shaft 2 in the gear, the sun shaft has a collar 2' on the end extending into the gear. This collar engages one side face of a slide disc 10, whose opposite second side face engages the axial, internal ends of the planet wheels 6 and 12.

Further, in particular in operation, the sun shaft 2 will be positioned by the planet wheel 6 which will press the sun shaft 2 inwards against the two planet wheels 12 which are mounted without play or substantially without play on the stays 13. It is observed that there are no other forms of bearings for controlling the sun shaft 2.

Prior to mounting, the inner diameter of the outer ring 4 is slightly smaller than the diameter of the circle that is tangent to the three planet wheels 6 and 12. It will be appreciated that the outer ring 4 when being elastically deformed presses the planet wheels 6 and 12 against the centrally arranged sun shaft 2.

Radial forces are created hereby between the outer ring 4, the planet wheels 6 and 12 as well as the sun shaft 2. These normal forces, together with the traction oil filled in the gearbox, ensure friction between the components of the gear, thereby causing the sun shaft 2 to rotate when the outer ring 4 is rotated by the carrier 1.

FIG. 2 shows the forces between an outer ring 4, a planet wheel 6 and a sun shaft 2. The situation where the gear does not rotate and everything is in balance, is shown in solid line. In operation, the planet wheel 6 will be displaced to a position which is shown in dashed line. It will be seen clearly that the planet wheel 6 is pressed against the sun shaft 2 by the bias of the elastic outer ring 4, and that the hole 6' in the planet wheel 6 is larger than the diameter of the stay 7, even though this difference is somewhat exaggerated in FIG. 2 for clarity.

The bias of the elastic outer ring 4 results in the generation of components which are designated as follows in FIG. 2:
Fnr=the normal force on the planet wheel from the outer ring,
Fns=the normal force on the planet wheel from the sun shaft,
Ftr=the tangential force between the planet wheel and the outer ring, and
Fts=the tangential force between the planet wheel and the sun shaft.

Since the equilibrium of forces must be fulfilled for a planet wheel, the resulting component in the direction (Fn) of the normal forces must be equal to the sum of the normal forces (Fnr, Fns), and the resulting component in the direction (Ft) of the tangential forces must be equal to the sum of the tangential forces (Ftr, Fts).

No centripetal forces occur, because the planet wheels 6 are loosely mounted on fixed stays 7.

The following linkage exists between the two components of force $$\frac{Fns - Fnr}{Ftr + Fts} = \text{tangent } v$$

or since Fts≅Ftr $$Fns \cong \text{tangent } v \cdot 2Ftr + Fnr$$

It will be seen by considering the components of force in FIG. 2 that the radial position of the stay 7 relative to the planet wheel 6 contributes to determining the transferable moment, as the frictional force is proportional to the normal force.

If the centre line of the stay 7 is moved outwards so as to coincide with the centre line of the planet wheel 6, then v=0, hence Fns=Fnr, and there is thus no ramp effect.

Where it is described above that the planet wheel 6 is mounted loosely on the associated stay 7, as the outer diameter of the stay is slightly smaller than the inner diameter of the hole in the planet wheel, it will of course be a matter of differences that are greater than the tolerances which exist in the structure. This means that the differences in diameters are in excess of the ordinary machining accuracy. Preferably, a difference may be involved which is greater than about 0.01 mm at the sizes involved here, which means e.g. a planetary gear having an outer diameter of the order of about 100 mm.

The same will apply to the distance by which the centre of one or more of the stays is displaced inwards toward the sun shaft, since here too a distance must be involved which is in excess of the normal machining accuracy. Preferably the distance is in excess of about 0.01 mm, e.g. in case of a planetary gear having an outer diameter of the order of about 100 mm. The distance may also be stated as being in a range of substantially 0.1–2.0 per thousand of the radial dimension of the gear and preferably in a range of substantially 0.5–1.0 per thousand.

FIG. 3 is an image of the carrier 1 and the elastic outer ring 4 in a position of rest.

It will be seen that in position (A) during rotation the holes 3 of the carrier 1 will press radially inwards against the pins 5 of the outer ring 4, and that in position (B) during rotation the holes 3 of the carrier 1 will exert a radially outward pull in the pins 5 of the outer ring 4.

The mentioned second frame part 8b may serve as a suspension for the gear, when this frame part 8b is secured in any suitable manner to a frame not shown in the drawings.

The diameter of the sun shaft 2 and the diameter of the planet wheels 6 are adjusted so as to achieve the desired gear ratio of the revolutions of the input stub shaft 1a and the sun wheel 2.

The part of the surface of the sun shaft 2 which is in contact with the planet wheels 6, may optionally be provided with a coating which can increase the friction.

The radial inner side of the outer ring 4 is advantageously provided with annular grooves 11 which prevent oil planing at high speeds, allowing the use of several different types of oil.

In a further embodiment, which is not shown in the drawing, the carrier is constructed to enclose the radial outer side of the outer ring, the carrier being provided with a collar which extends along the outer ring. The radial inner side of the collar carries elements in the form of pins or rollers whose engagement with the outer ring is positioned on a pitch circle which is smaller than the outer diameter of the outer ring in the unloaded state of the outer ring. This provides stabilization of the outer ring.

An alternative embodiment of the invention is shown in FIGS. 4–7, where parts constructed in a manner similar to FIGS. 1 and 3 are designated by the same reference numerals. Thus, this embodiment, too, involves a disc-shaped carrier 1 having a protruding stub shaft 1a as well as a protruding end of the sun shaft 2 on the other side. This embodiment likewise has an elastic outer ring 4 with pins 5 extending into holes 3 in the carrier 1. Also, there is a plurality of planet wheels 6 and 12 positioned inside the gear, and a frame 8 comprising two parts 8a and 8b controls the planet wheels by means of stays 7 and 13. The outer ring 4 may moreover be provided with annular grooves 11 on its inner face to prevent oil planing at high speeds.

Instead of the above-mentioned stay 7 whose outer diameter is smaller than the hole 6' in the planet wheel 6, this embodiment uses a stay 7' having an eccentric body 15. The stay 7' is carried by the frame 8, and the eccentric body 15 is mounted rotatably on the stay, but fixed relative to the inner part of the planet wheel.

Further, a ball or roller bearing, whose outer ring serves as a planet wheel 6, is shrunk on the eccentric 15.

As will appear from FIGS. 4 and 6, a ramp effect may be achieved also in this manner, since the distance from the centre of the stay 7' to the centre of the sun shaft 2 is smaller than the distance from the centre of the planet wheel 6 to the centre of the sun shaft 2. This is ensured in that the centre of the axis of the stay 7' is positioned closer to the sun shaft than the centre of the eccentric 15. This centre will be able to move and thereby ensure the ramp effect when the planet wheel 6 engages the sun shaft 2.

In this embodiment, the planet wheels 12 and 6 may be constructed identically. The planet wheels 12 may e.g. be constructed in the same manner as the planet wheel 6, whose outer bearing ring serves as a planet wheel, and be formed with inwardly pressed roller bearings 16 whose bearing ring is shrunk on the stays 13.

Finally, a planetary gear according to the invention may be constructed as shown in FIGS. 5 and 7, which correspond to the embodiment shown in FIG. 4, except that here the centre of the stay 7' is positioned further away from the sun shaft 2 than the centre of the eccentric body 15, but still so that the distance from the centre line of the planet wheel 6 to the sun shaft 2 is smaller than the distances from the centre lines of the planet wheels 12 to the sun shaft 2. This, too, will result in a ramp effect, but simultaneously an overload protection will be achieved. By suitable dimensioning of the distances and dimensions, the ramp effect will just amount to a certain limit value where the centre of the eccentric will move to the other side of the line through the centre of the sun shaft 2 and of the stay 7'. Then, the possibility of moment transfer will be removed.

FIGS. 8a–8c are sketch views of a section of an outer ring 4, a sun shaft 2 and planet wheel 6 in a planetary gear according to the invention, illustrating the distance conditions for achieving the ramp effect. The example shown illustrates an embodiment having a stay 7 with a smaller external diameter than the hole 6' in the planet wheel 6, but the same conditions will apply to this embodiment where an eccentric 15 is used. As will be seen, the radius of the circle with the centre in the sun shaft 2 and the circumference through the centre of the planet wheel 6 is called $PCD_r$, and the radius of the circle with the same centre and circumference through the centre of the stay is called $PCD_s$. The difference between these two is called a, and the distance between the centre of the planet wheel 6 and the centre of the stay 7 is called r. If, as shown in FIG. 8c, the stay 7 engages the inner side of the planet wheel 6 at the sun shaft 2, which means in the position of rest, then $PCD_s = PCD_{s\ min}$, and a will be equal to r.

FIG. 8a shows the conditions when a=0, while FIG. 8b shows the conditions when a is greater than 0, but smaller than r. Finally, FIG. 8c shows the conditions when a=r. In the invention, as will be seen, it is so that the distance r will be greater than the distance a is in operation.

The force that can be transferred in a planetary gear according to the invention may be calculated by means of the mentioned quantities, the result being dependent on the difference between r and a. An example of such a calculation is shown in FIG. 9, in which theoretical force transferred to a centre shaft as a function of a is calculated for a planetary gear having an outer ring with an inner diameter D of 90 mm, where r=0.09 mm, and where the moment from the outer ring on the planet wheel is 35 Nm. As will be seen, the force transferred will be minimum and exclusively depend on the bias from the outer ring when a=0, as is shown in FIG. 8a, while there will be an approximately asymptotic increase when a approaches the size of r.

The foregoing examples just show planetary gears having three planet wheels, one of which is positioned in the characteristic manner according to the invention. It is evident that more than three planet wheels, e.g. four, may be used, of which one or two are arranged in the characteristic manner according to the invention, while the others are arranged without play or substantially without play on the respective stays.

It is moreover clear that other embodiments than those described may occur within the scope of the following claims. Thus, e.g. the outer ring 4 may be provided with holes instead of the pins 5, while the carrier 1 may correspondingly be provided with pins instead of holes 3. Moreover, other forms of bearings between the stays and the planet wheels than the shown slide or roller bearings may occur.

The planetary gear according to the invention may be used in connection with e.g. internal combustion engines, as mentioned, Generally, however, the invention may be applied where a transfer of moment having a great gear ratio, e.g. up 13:1, and/or a relatively great transfer of moment is required, in particular where the space available for a gearbox is relatively scarce. Further, the invention may be applied in cases where the transfer must allow sliding or slipping between the two rotary movements, so that these movements are not locked to each other, and finally the invention may be applied with an incorporated overload protection, as described previously.

Finally, the invention may be used in connection with special applications, an example of which being transfer of moment in vehicles where a force-generating unit, such as an electric motor, is incorporated in or at one or preferably several wheels. Here, the moment is to be transferred to the wheel within a desired range of revolutions and using a mass as small as possible, since this mass will form part of the non-suspended weight at the wheel structure. The planetary gear according to the invention may thus be used to great advantage here. The planetary gear according to the invention may also be used to advantage in connection with other similar structures or energy-transferring systems.

What is claimed is:

1. A planetary gear comprising a rotatably mounted sun wheel, at least three planet wheels arranged around the sun wheel which are rotatable about their own axes, and having peripheral surfaces in a form of surfaces of revolution, means for resiliently pressing the peripheral surfaces of the planet wheels into force-transferring engagement with a peripheral outer face of the sun wheel, at least one and maximum two of the at least three planet wheels (12) mounted for rotation on a corresponding stay (7) such that the at least one and maximum two axes of rotation are substantially fixed relative to an axis of rotation of the sun wheel (2), at least one other of said at least three planet wheels (6) being arranged on a stay (7) extending with a predetermined play into a central bore provided in said at least one other of said at least three planet wheels, such that a radial distance between a center line of the stay (7) and the axis of rotation of the sun wheel (2) is smaller by a predetermined value than a corresponding radial distance between a center line of said at least one other planet wheel (6) and the axis of rotation of the sun wheel (2) when the planetary gear is in an operational state, in which all the planet wheels (6,12) are in engagement with the sun wheel (2), and each of the stays is in engagement with an inner surface of a corresponding bore.

2. The planetary gear according to claim 1 wherein a difference in the radial distances is in excess of normal machining tolerances.

3. The planetary gear according to claim 1 wherein a difference in the radial distances is in a range of substantially 0.1–2.0 per thousand of the radial dimension of the planetary gear.

4. A planetary gear according to claim 1 wherein at least one of the corresponding stay or stays (7) are formed with an outer diameter which is smaller than an inner diameter of the corresponding bore (6') in at least one planet wheel (6), the difference in diameters being in excess of normal machining tolerances, preferably in excess of about 0.01 mm.

5. The planetary gear according to claim 1 wherein at least one planet wheel (6) and the corresponding stay therefore (7') are constructed such that the corresponding stay (7') has an eccentric (15) mounted rotatably thereon.

6. The planetary gear according to claim 5 wherein a center of the stay (7') is positioned closer to a center of a sun shaft than to a center of the associated eccentric (15).

7. The planetary gear according to claim 5 wherein a center of the stay (7') is positioned further away from a center of a sun shaft than from a center of the associated eccentric (15).

8. The planetary gear according to any one of claims 1–7, wherein the planetary wheels (6,12) are constructed substantially identically, each having an inner diameter substantially corresponding to an outer diameter of the stays (7).

9. The planetary gear according to claim 1 wherein a difference in the radial distances is in excess of about 0.01 mm.

10. The planetary gear according to claim 1 wherein a difference in the radial distances is in a range of substantially 0.5–1.0 per thousand of a radial dimension of the planetary gear.

11. The planetary gear according to any one of claims 1–7, 9 or 10 wherein the planetary wheels (6,12) are constructed substantially identically as bearings, each having an inner diameter substantially corresponding to an outer diameter of the stays (7), and each having an outer bearing ring which serves as a planet wheel.

12. The planetary gear according to any one of claims 1–7, 9 or 10 wherein the planetary wheels (6,12) are constructed substantially identically as roller bearings, each having an inner diameter substantially corresponding to an outer diameter of the stays (7), and each having an outer bearing ring which serves as a planet wheel.

13. The planetary gear according to any one of claims 9 or 10 wherein the planetary wheels (6,12) are constructed substantially identically, each having an inner diameter substantially corresponding to an outer diameter of the stays (7).

14. A method for transferring a rotational moment at a high gear ratio using a relatively small volume apparatus from an internal combustion engine to a compressor or to propulsion wheels on a vehicle comprising:

providing a planetary gear having a rotatably mounted sun wheel, at least three planet wheels arranged around the sun wheel which are rotatable about their own axes, and having peripheral surfaces in a form of surfaces of revolution, means for resiliently pressing the peripheral surfaces of the planet wheels into force-transferring engagement with a peripheral outer face of the sun wheel, at least one and maximum two of the at least three planet wheels (12) mounted such that the at least one and maximum two axes of rotation are substantially fixed relative to an axis of rotation of the sun wheel (2), at least one other of said at least three planet wheels (6) being arranged on a stay (7) extending with a predetermined play into a central bore provided in said at least one other of said at least three planet wheels, such that a radial distance between a center line of the stay (7) and the axis of rotation of the sun wheel (2) is smaller by a predetermined value than a corresponding radial distance between a center line of said at least one other planet wheel (6) and the axis of rotation of the sun wheel (2) when the planetary gear is in an operational state, in which all the planet wheels (6,12) are in engagement with the sun wheel (2), and each of the stay is in engagement with an inner surface of a corresponding bore, and, utilizing the planetary gear for transferring a rotational moment from the internal combustion engine to the compressor or to propulsion wheels on the vehicle.

15. The method according to claim 14 further comprising transferring the rotational moment at a high gear ratio of up to 13:1.

* * * * *